United States Patent [19]

Follmer

[11] Patent Number: 5,233,523
[45] Date of Patent: Aug. 3, 1993

[54] COMPENSATION FOR DELAY OF SCHEDULED GEARSHIFTS IN AUTOMATIC TRANSMISSIONS

[75] Inventor: William C. Follmer, Livonia, Mich.

[73] Assignee: Ford Motor Company, Dearborn, Mich.

[21] Appl. No.: 631,811

[22] Filed: Dec. 21, 1990

[51] Int. Cl.⁵ .............................................. B60K 41/06
[52] U.S. Cl. ..................................... 364/424.1; 74/866
[58] Field of Search ............... 364/424.1; 74/844, 845, 74/856, 857, 861, 862, 866

[56] References Cited

U.S. PATENT DOCUMENTS

| | | | |
|---|---|---|---|
| 4,285,252 | 8/1981 | Yamaki et al. ........................... | 74/866 |
| 4,335,428 | 6/1982 | Miki et al. ............................. | 364/424.1 |
| 4,380,048 | 4/1983 | Kishi et al. ........................... | 364/424.1 |
| 4,393,467 | 7/1983 | Miki et al. ............................. | 364/424.1 |
| 4,490,790 | 12/1984 | Shinoda .............................. | 364/424.1 |
| 4,692,866 | 9/1987 | Kosugue ............................. | 364/424.1 |
| 4,897,790 | 1/1990 | Bieber ................................ | 364/424.1 |
| 4,905,544 | 3/1990 | Ganoung ............................... | 74/866 X |
| 4,905,786 | 3/1990 | Miyake et al. ................. | 364/424.1 X |
| 4,943,921 | 7/1990 | Baltusis et al. ................... | 364/424.1 |
| 5,019,979 | 3/1991 | Takahashi ......................... | 364/424.1 |
| 5,109,967 | 5/1992 | Saitou et al. ......................... | 74/862 X |

Primary Examiner—Vincent N. Trans
Assistant Examiner—Thomas S. Auchterlorie
Attorney, Agent, or Firm—Frank G. McKenzie; Roger L. May

[57] ABSTRACT

A control for producing ratio changes in an automatic transmission includes sensors producing signals from which vehicle speed, throttle position, vehicle acceleration, and the time rate of throttle position are determined. Electronic memory accessible to a microprocessor contains functions relating vehicle speed to throttle position, one function being related to each upshift and downshift. Shift solenoids are energized and deenergized according to the output of a control algorithm executed by the microprocessor. A hydraulic circuit contains shift valves, servos, brakes and clutches activated by the servos selectively to produce the various gear ratios of the transmission. Shift delays for each upshift and downshift are predetermined and stored as constants in memory. A shift schedule relating throttle position, vehicle speed and the current transmission gear ratio is stored in memory. Control variables compensating for shift delay on the basis of vehicle acceleration and throttle rate are calculated. A vehicle acceleration compensation value is substituted for vehicle speed and a throttle rate compensation value is substituted for throttle position. Signals produced by the microprocessor upon executing the control algorithms alter the state of shift solenoids in accordance with a predetermined schedule of the solenoid states that produces the commanded gear ratio.

12 Claims, 6 Drawing Sheets

| PRNDL | OD CANCEL | GEAR | SS1 | SS2 | SS3 |
|---|---|---|---|---|---|
| OD | OFF | 1 | OFF | ON | OFF |
|  | OFF | 2 | ON | ON | OFF |
|  | OFF | 3 | OFF | OFF | ON |
|  | OFF | 4 | ON | OFF | ON |
| 'D' | ON | 1 | OFF | ON | OFF |
|  | ON | 2 | ON | ON | OFF |
|  | ON | 3 | OFF | OFF | OFF |
| 1 |  | 1 | OFF | ON | — |
|  |  | 2 | OFF | OFF | — |
| R |  | R | — | — | OFF |

| | Vehicle Acceleration Compensation Delay | Throttle Rate Compensation Delay |
|---|---|---|
| Upshift<br>1-2<br>2-3<br>3-4 | | |
| Downshift<br>4-3<br>3-2<br>2-1 | | |

FIG. 6.

COMPENSATION FOR DELAY OF SCHEDULED GEARSHIFTS IN AUTOMATIC TRANSMISSIONS

BACKGROUND OF THE INVENTION

1. Field of the Invention

This invention relates to the field of automatic control of gearshifts in transmissions that occur in accordance with a schedule relating engine throttle position and vehicle speed. It pertains particularly to a control technique that accounts for vehicle acceleration and throttle speed to minimize gearshift delay and to produce gearshifts at the correct scheduled vehicle speed.

2. Description of the Prior Art

The invention relates to automotive transmission controls of the type disclosed in U.S. Pat. No. 4,943,921 and U.S. Ser. No. 289,889, filed Dec. 27, 1988. That application and patent are assigned to the assignee of this invention.

In an electronically controlled, variable speed automatic transmission, the current gear ratio is determined on the basis of a schedule, stored in electronic memory accessible to a microprocessor, relating vehicle speed to throttle position. The schedule defines boundaries between operating conditions on the basis of vehicle speed and throttle position, each boundary separating an operating range for a particular gear ratio from an adjacent range of these variables where a different gear ratio is the appropriate gear ratio. Generally for a current gear ratio, the shift schedule produces a reference vehicle speed, the dependent variable, when memory is addressed with the current throttle position, the independent variable. The reference vehicle speed is compared to current vehicle speed periodically so that upshifts and downshifts from the current gear occur when vehicle speed rises above or falls below boundaries corresponding to the current gear ratio and throttle position.

However, a typical transmission requires several seconds to complete a gearshift following issuance of a signal commanding the shift, the delay resulting principally from time required to energize and deenergize solenoid-operated valves in a hydraulic control circuit, response time to move hydraulic shift valves in the circuit, and response time to apply and release hydraulic servos that alter the state of clutches and brakes in the gearbox whose engagement produces the new gear ratio.

Normally the vehicle is accelerating when a gearshift command issues. Although the shift is commanded when current vehicle speed exceeds the scheduled value corresponding to the current throttle position and current gear ratio, yet the shift is completed at a different vehicle speed due to transmission delay (usually between one and two seconds) and vehicle acceleration during the delays period. Consequently upshifts and downshifts can occur too late.

The throttle is opened by depressing an accelerator pedal. Typically, this action produces a downshift to a lower operating gear ratio where greater torque is delivered to the drive wheels of the vehicle. Consequently, vehicle speed increases. But if vehicle speed exceeds the intended vehicle speed, the accelerator pedal is partially released, thereby inducing an upshift to a higher gear ratio where drive wheel torque decreases and vehicle speed drops.

Operation of the transmission in combination with the engine throttle in this objectionable manner is called "hunting", a cyclic repetition of gear shifts between adjacent gear ratios with corresponding changes in vehicle speed.

A conventional technique to cure delayed upshifts and downshifts is to relocate the shift calibration points to compensate for the delay error at a typical vehicle acceleration. This action produces shift timing errors at all other accelerations and may be impossible to implement if it causes upshift and downshift calibration lines to intersect.

Various techniques have been devised to avoid shift delay error. A control technique that uses throttle speed to define a new gearshift schedule is described in U.S. Pat. No. 4,490,790. The control accelerates the vehicle rapidly when throttle rate is high and slowly when throttle rate is low. There is no provision for vehicle acceleration to reduce transmission delay to the expectations of the driver.

U.S. Pat. No. 4,335,428 describes a technique for detecting increased engine load when running on a slope and determining the appropriate gear ratio in accordance with the magnitude of the loading associated with the inclination of the slope. Slope detecting reference data, indicative of vehicle speeds for various ranges of slope correspond to throttle openings in different gear ratios, are used to detect presence of the slope by comparing the actual gear ratio, the throttle opening, vehicle speed, against the slope detecting reference data.

Signals indicative of the shift lever position, vehicle speed and throttle opening are applied as input to a microprocessor, a slope detecting program determines presence of the slope from these data and modifies standard shift data to produce shift reference data, which is then written into memory. By comparing the current gear ratio throttle opening and vehicle speed against corresponding reference data, a speed ratio is determined and used to energize solenoid valves to produce gear ratio changes in accordance with the control programs.

The gear shift control of U.S. Pat. No. 4,285,252 uses a stored schedule of vehicle acceleration and a comparison between actual vehicle acceleration to the stored value to change scheduled gear shift in accordance with differences between stored and actual vehicle acceleration. The control includes a first schedule of gear shift changes suitable when the vehicle is traveling on a flat road and a second schedule for gear changes suitable for an uphill road. On the basis of a stored schedule of vehicle accelerations, reference to throttle position and actual vehicle acceleration, the slope of the grade is determined, and a gear shift schedule corresponding to the slope is selected to control gear shifts while on the grade.

The gear shift control of U.S. Pat. No. 4,380,048 relies on an average value of engine load and vehicle speed to determine a programmed acceleration, which is compared to actual acceleration to determine whether a transmission shift characteristic is to be selected.

The gear shift control of U.S. Pat. No. 4,897,790 intentionally skips selected drive ratios on the basis of perceived driving conditions and modifies the scheduled gear ratio change on the basis of vehicle acceleration.

It is preferable that a gearshift control for automotive use should anticipate the effect of vehicle acceleration and inherent delay and command each gearshift before the shift is required. If transmission delay is determined for all possible gearshifts, that delay can be compensated accurately on the basis of vehicle acceleration so that response to the shift command produces a change of gear ratio at the scheduled vehicle speed. Account can be taken also for the rate of throttle position change to further advance the gearshift command in accordance with driver expectations as evidenced by control of the accelerator pedal.

SUMMARY OF THE INVENTION

An electronic control system for scheduling gearshifts in a multiple speed automatic transmission includes storing in electronic memory, accessible to a microprocessor, functions relating vehicle speed to throttle position, one function being related to each upshift and downshift. Gearshifts are made by probing computer memory with current values of throttle position and vehicle speed, and determining on the basis of the stored shift schedule whether an upshift or downshift is required. Upshift points are determined also on the basis of the maximum engine speed when a wide open throttle condition is detected. Delayed shifts are inherent in this technique.

To overcome this difficulty and to avoid having to redefine a new gearshift schedule that accounts for throttle position, throttle rate and vehicle acceleration, a first control variable is defined, which increases current vehicle speed by a quantity that is a function of transmission delay and vehicle acceleration. A second control variable increases current throttle position by a quantity that is a function of transmission delay and the time rate of change of throttle position. Transmission delay is determined empirically for a motor vehicle equipped with a transmission controlled by the conventional gearshift schedule that defines gearshift points for each gear ratio on the basis of current throttle position and current vehicle speed. These transmission delay values are stored in electronic memory as a function of the gear ratio changes to which they pertain. An algorithm providing for gearshift delay compensation calculates the first and second control variables using the stored functions and current values of vehicle acceleration and throttle rate. These calculated control variables are then substituted for the corresponding values of vehicle speed and throttle position in the predetermined gearshift schedule relating these variables. On this basis gearshifts then are commanded.

In realizing the objectives of this invention, the control system includes sensors producing signals from which vehicle speed, throttle position, vehicle acceleration, and the time rate of throttle position are determined. Electronic memory accessible to a microprocessor contains functions relating vehicle speed to throttle position, one function being related to each upshift and downshift. Shift solenoids are energized and deenergized according to the output of a control algorithm executed by the microprocessor. A hydraulic circuit contains shift valves, servos, brakes and clutches activated by the servos selectively to produce the various gear ratios of the transmission. Shift delays for each upshift and downshift are predetermined and stored as constants in memory. A shift schedule relating throttle position, vehicle speed and the current transmission gear ratio is stored in memory. Control variables compensating for shift delay on the basis of vehicle acceleration and throttle rate are calculated. A vehicle acceleration compensation value is substituted for vehicle speed and a throttle rate compensation value is substituted for throttle position. Signals produced by the microprocessor upon executing the control algorithms alter the state of shift solenoids in accordance with a predetermined schedule of the solenoid states that produces the commanded gear ratio.

DESCRIPTION OF THE PREFERRED EMBODIMENT

Figure 1:
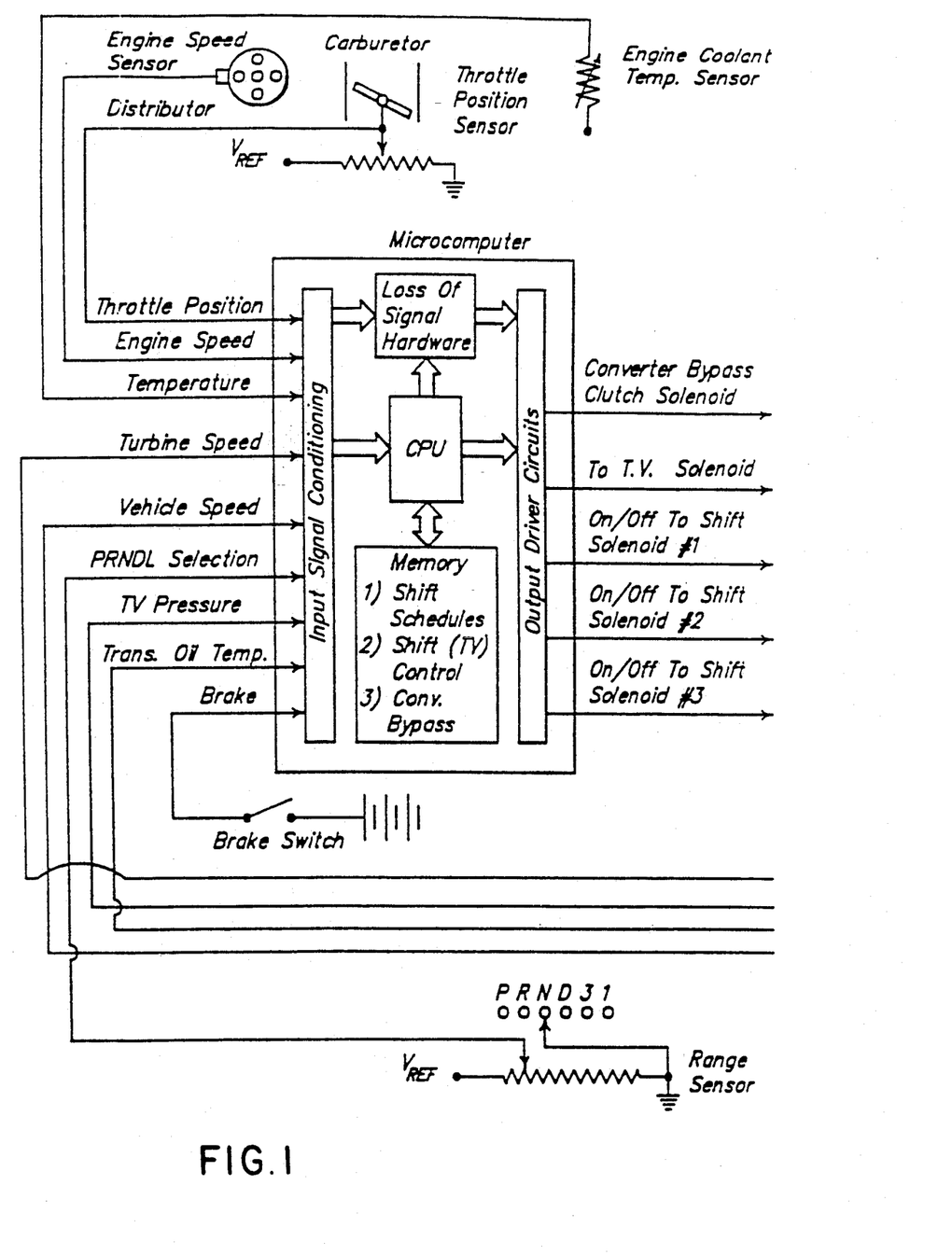
FIG. 1 is a schematic representation of a microprocessor including input signals representing the state of various operating parameters and output signals applied to a hydraulic valve body.
Figure 2:
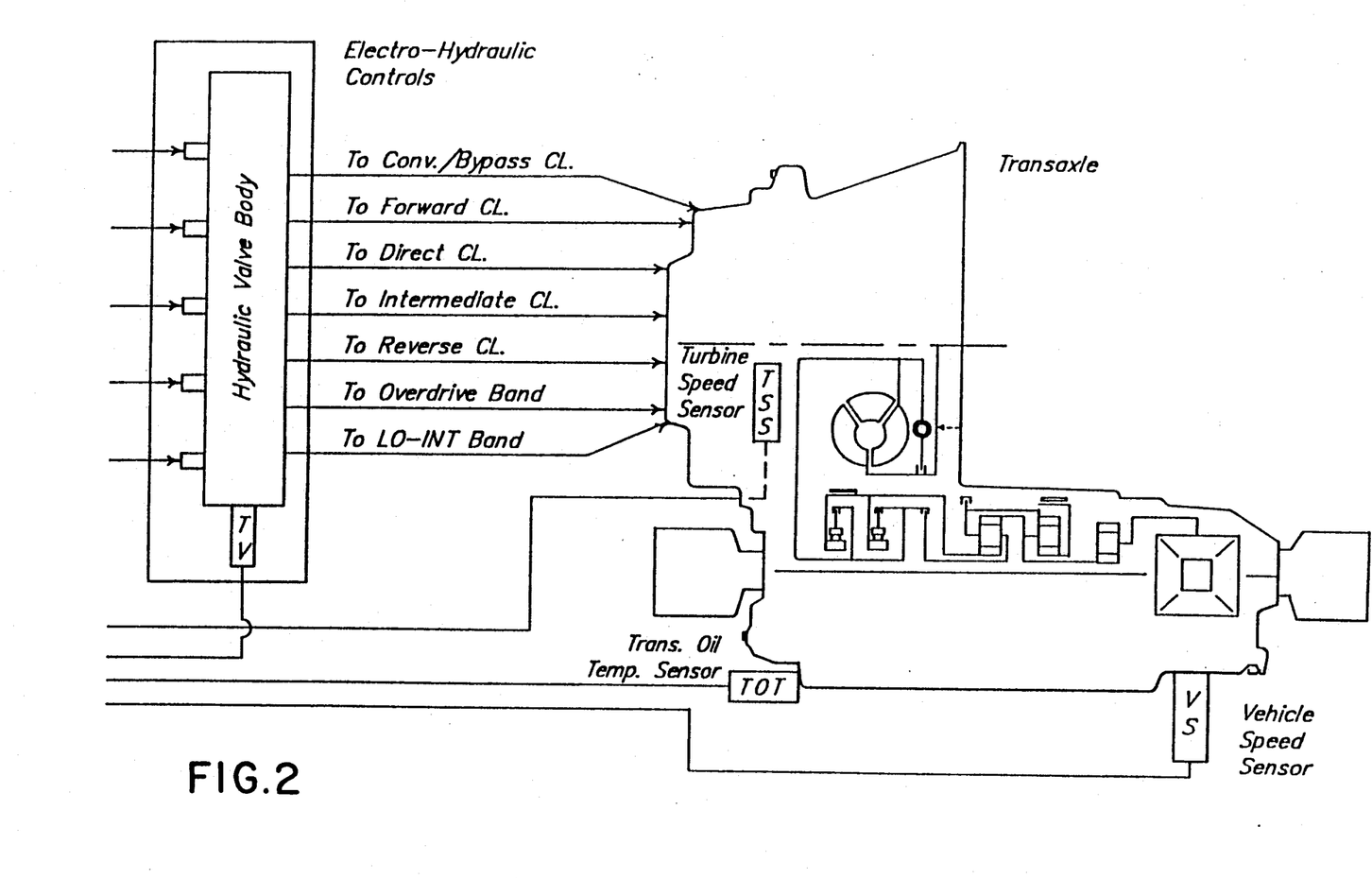
FIG. 2 is a continuation of the view of FIG. 1 showing the hydraulic valve body and its relationship to the clutches and brakes of the transmission.

FIG. 1 shows a schematic diagram of a microcomputer circuit and valve system. Various sensors produce signals representing the state of the sensors or the magnitude of various operating parameters. These signals are received by input signal conditioning circuits where analog signals are converted to digital signals and noise is filtered. Various buses carry signals among permanent memory in the form of keep-alive memory (KAM) and read only memory (ROM), a central processing unit, relatively volatile, random access memory (RAM), input conditioning circuits, and output driver circuits. Gearshift schedules, calibration constants, functions and tables are stored in permanent or volatile memory; however, current values for operating parameters are stored generally in ROM. The output driver circuits receive signals from the central processing unit and produce electronic control signals as outputs applied to the solenoids of electromagnetically operated valves located in the hydraulic valve body, those shown in FIG. 2. The output signals are sent to three solenoid valves (SS1, SS2, SS3), a variable force throttle valve (TV) solenoid and a torque converter bypass clutch solenoid.

A vehicle speed sensor produces a signal representing the speed of the transmission output shaft. The speed of the torque converter turbine is represented by a signal produced by a turbine speed sensor. The engine throttle position, i.e., the extent to which the engine throttle opens the intake manifold, is represented by a signal produced by a throttle position sensor. An algorithm produces gear ratio changes in the transmission by producing signals in accordance with control logic stored in ROM to selectively energize and deenergize the shift solenoid valves, which selectively engage and disengage clutches and brakes of the transmission to produce the various gear ratios.

Figure 3:
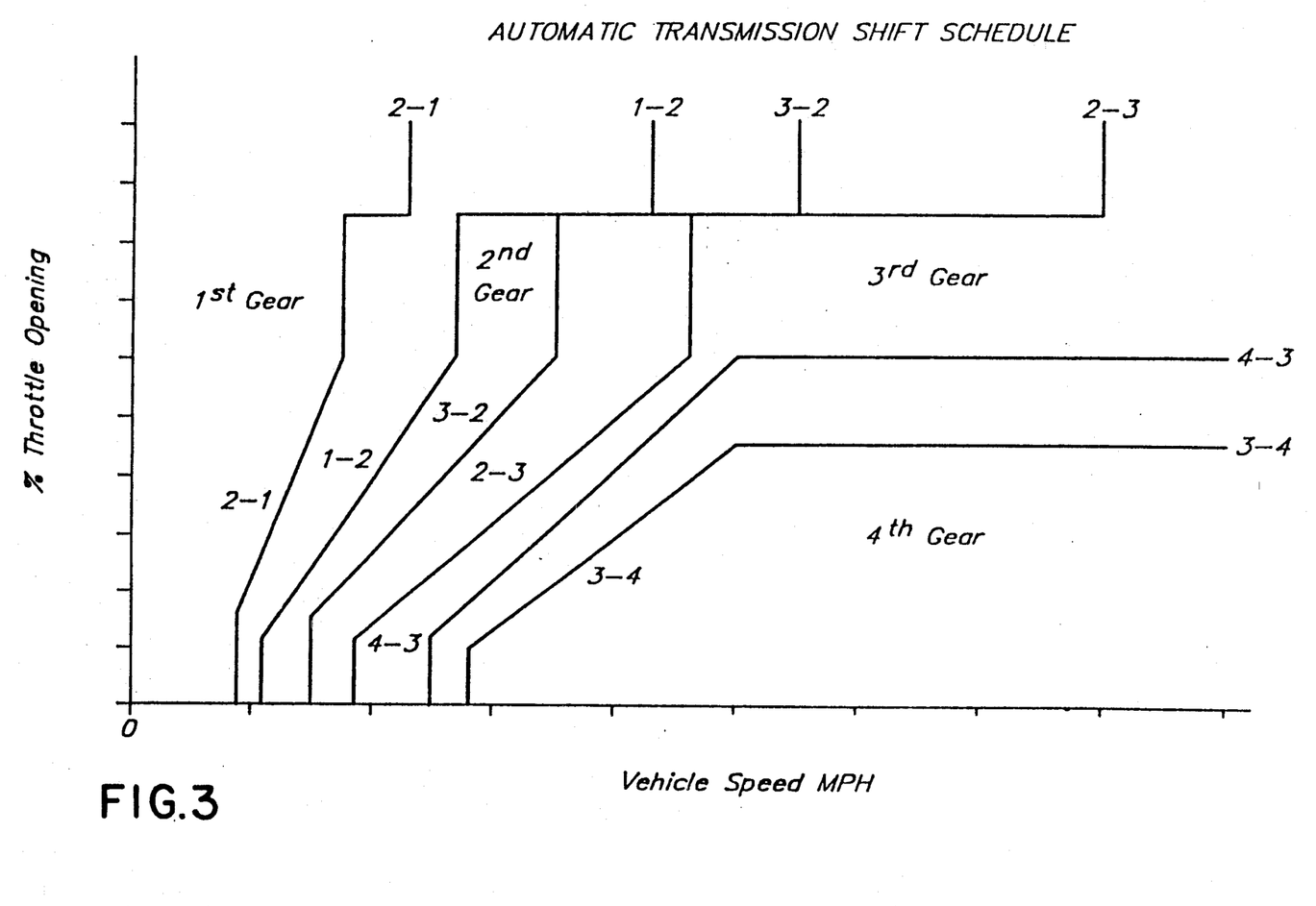
FIG. 3 is a chart showing energized and deenergized states of the three solenoid-operated shift valves of the hydraulic control circuit.

The shift solenoids SS1, SS2, SS3 are energized and deenergized to the on-off states shown in FIG. 3 to produce four forward gears and a reverse gear. The shift selector, controlled by the vehicle operator and referred to as a PRNDL lever, is capable of several ranges OD, D, 1 AND R. The gear selector also has an OD cancel switch controlled by the vehicle operator, which when engaged prevents operation in fourth gear when the PRNDL selector is moved to the D range. In the OD range, the four forward gears of the transmission can be produced. In the 1 range, logic present in the hydraulic control circuit prevents engagement of the third and fourth gears but permits engagement of the first and second gears. When the PRNDL selector is moved to the R position, only reverse gear results. The combined states of the shift solenoid valves results in each of the gears of the transmission shown corresponding to the PRNDL range and the state of the OD cancel switch.

Stored in electronic computer memory accessible to the central processing unit is a gearshift schedule relating vehicle speed to throttle position, usually stated in terms of throttle position counts produced by the throttle position sensor. The schedule is represented graphically in FIG. 4. Each of these counts corresponds to the extent to which the engine throttle fully opens the engine manifold. The gearshift schedule defines ranges for operation in each of the four forward gears of the transmission and lines between these ranges where upshifts (1-2, 2-3, 3-4) and downshifts (2-1, 3-2, 4-3) are commanded when a current operating condition of the powertrain, represented by a point on the chart. The abscissa is vehicle speed and the ordinate is throttle position. When the current operating condition crosses the 1-2 upshift line separating the first gear range from the second gear range, then second gear is commanded. Similarly, when the transmission is operating in third gear and the current operating condition crosses the 3-4 upshift line, then fourth gear is commanded. Control logic in the form of algorithms stored in memory are executed and ultimately produce a command from the CPU to the solenoid-driver circuits which energize selectively the three shift solenoids in accordance with the combination of states for the shift solenoids required to produce the commanded gear ratio. Similarly, when the transmission is operating in fourth gear and a current operating point defined by the current vehicle speed and current throttle position crosses the 4-3 downshift line, a downshift to third gear is commanded.

Figure 5:
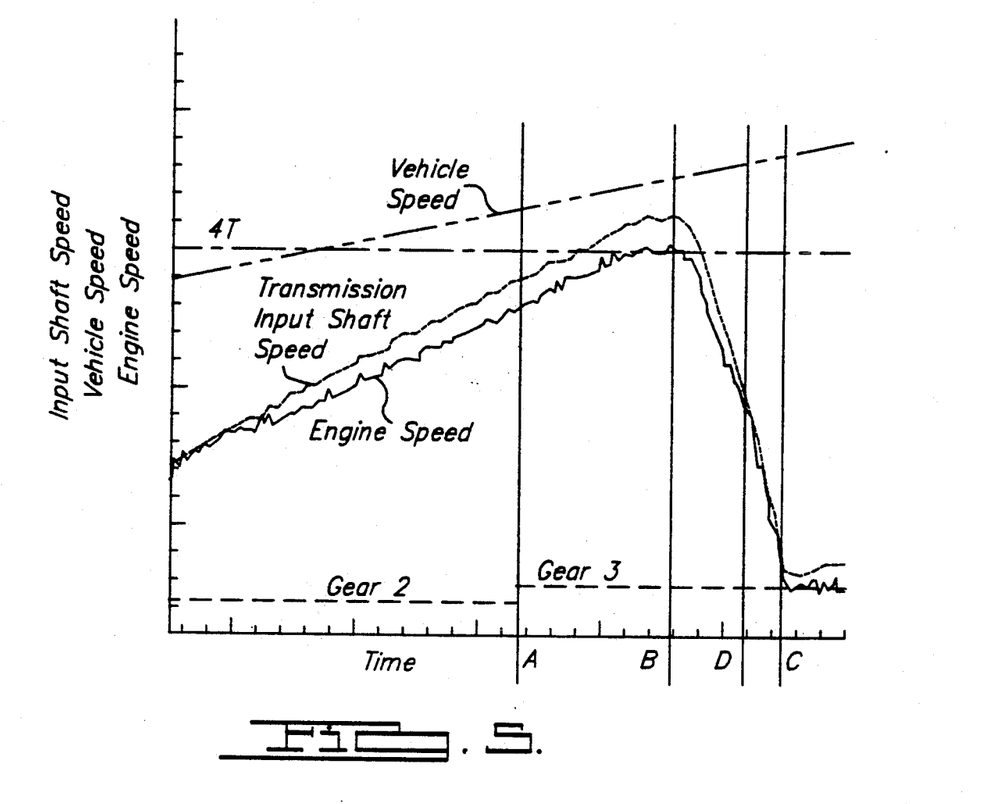
FIG. 5 shows the relation among vehicle speed, transmission input shaft speed, and engine speed and their variation over time for a conventional 3-2 gearshift without delay compensation.

FIG. 5 shows the variation of vehicle speed, transmission input shaft speed and engine speed for a 2-3 upshift in an automatic transmission. When current engine throttle position is maintained constant, vehicle speed increases steadily, though nonlinearly throughout the full period; input shaft speed and engine speed increase steadily to values that peak when the states of the brakes and clutches that produce the gearshift change. Thereafter, engine speed and input shaft speed decline relatively rapidly over a short period until the shift is completed at time C. Then they increase again after the upshift is completed and while throttle position is maintained constant. Although the shift is commanded by the control algorithms at time A, there is a delay extending to time B during which the upshift command produced by the control algorithms is executed, the shift solenoids are energized and deenergized, the hydraulic control circuit responds to the changed state of the solenoids, hydraulic servos are actuated in accordance with the new state of the hydraulic shift valve, and tolerances and clearances within the servos are taken up. Following time B, extending to time C, is an additional delay during which the transmission torque is shifted from the offgoing friction elements to the oncoming friction elements in response to the pressurized and vented state of the servos and the planetary gearing changes from the second gear ratio to the third gear ratio. The shift is completed at time C when the continual decline of engine shaft speed and input shaft speed ends and those components reaccelerate.

To establish the length of these delay periods, a vehicle is driven through a series of fixed throttle angle accelerations from zero vehicle speed to an equilibrium vehicle speed in the highest gear attainable at the current throttle angle. Throttle position is chosen to intersect the shift curves for best shift curve definition. Four or five throttle positions may be selected to adequately define the schedule.

To determine downshift delays, the vehicle runs initially at a condition that provides operation in the highest appropriate gear at a selected throttle position. The wheel foot brakes are applied and throttle position is held constant to reduce vehicle speed and to force downshifts to occur. If there are verticle lines in the shift schedule, i.e., at constant throttle, it may be necessary to run constant speed scans. To do this for downshifts, the vehicle is first accelerated to the desired initial speed and throttle position. Then, concurrently the brakes are applied slowly and throttle position is opened slowly to force a downshift while maintaining the vehicle speed nearly constant. A similar process is used for upshifts. The initial condition is set with the brakes applied to regulate vehicle speed at the desired throttle position. The throttle is closed slowly to force an upshift while the brakes are modulated to maintain desired vehicle speed.

Data representing vehicle speed, throttle position, engine speed, and transmission input shaft speed are recorded at spaced time intervals. The delays for which compensation is made begin when a commanded gearshift occurs and extend until the shift is completed. These delays are a matter of definition and can extend over shorter periods normally beginning with the gearshift command and ending when the oncoming and offgoing friction elements attain the state required to produce the commanded gear ratio. For example, a mean time to shift delay can be defined as a period between time A and time D, where D represents a point in time midway between B and C.

This process for defining scheduled upshifts and downshifts in an automatic transmission operating in a powertrain that includes an engine controlled by a variable position throttle is used to determine delays for both upshifts and downshifts that are compensated for by the present invention. The magnitude of each delay varies with the gear ratio change and with the throttle position. The magnitude of the compensated delay for a particular gearshift can be the mean value of the delay over the full range of throttle position.

Figure 4:
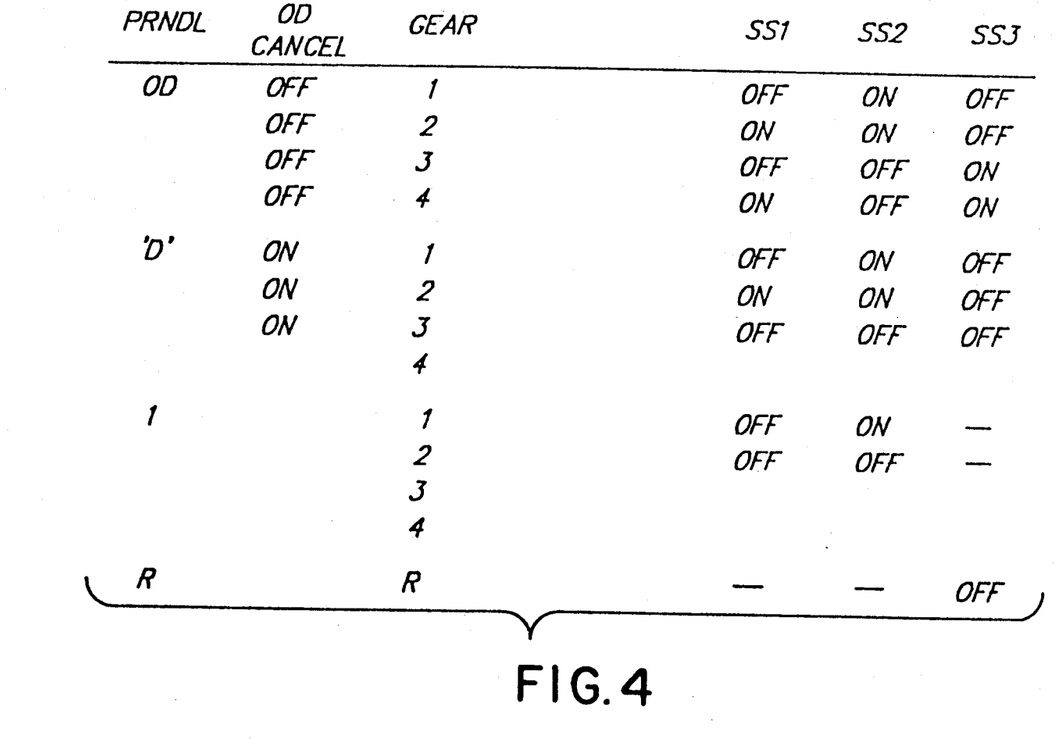
FIG. 4 is a chart showing a shift schedule relating throttle opening and vehicle speed, and upshift and downshift lines where sc gearshifts are commanded.
Figure 7:
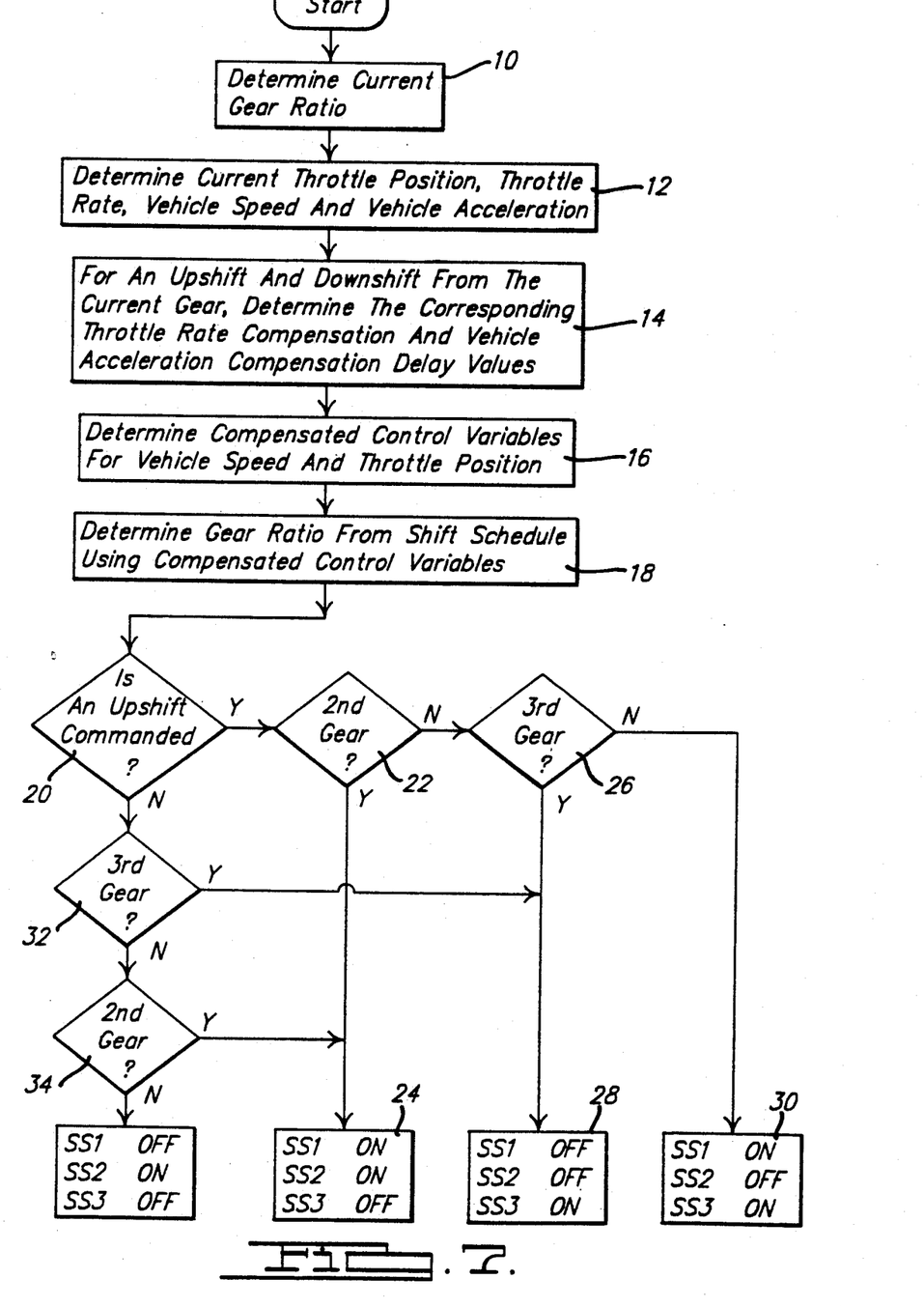
FIG. 7 is a control algorithm for producing a delay compensated gearshift according to the present invention.

FIG. 7 outlines a control algorithm employing delay compensation that accounts for vehicle acceleration and throttle rate in commanding gear ratio changes with reference to a predetermined gearshift schedule, such as that of FIG. 4.

Figure 6:
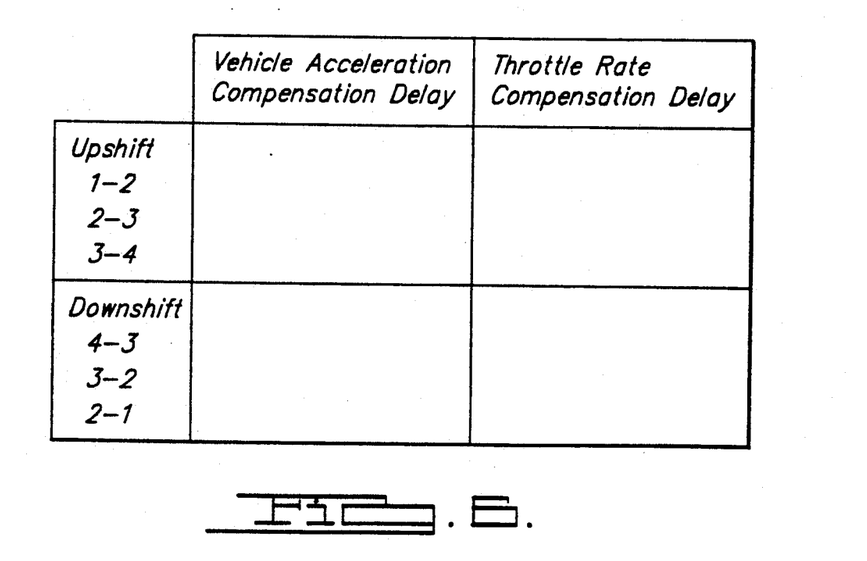
FIG. 6 is a schedule representing delay values for various upshifts and downshifts used to determine shift compensation variables.

At statement 10, the current gear ratio is determined by the energized and deenergized state of the three shift solenoids SS1, SS2, and SS3 and the corresponding gear ratios set forth in the table of FIG. 3. The current magnitude of throttle position and throttle rate are determined respectively from the throttle position signal produced by the throttle position sensor and the time rate of change that occurs over a period of predetermined length between successive executions of this control algorithm. Similarly, vehicle speed is determined from the signal produced by the vehicle speed sensor, and vehicle acceleration is determined by the time rate of change of vehicle speed that occurs over a period of predetermined length between successive executions of the control algorithm. At statement 14, delay values for throttle rate compensation and vehicle acceleration compensation are determined from values calibrated as described above, which are stored in electronic memory on the basis of whether an upshift or a downshift from the current operating gear ratio is required. A function representing vehicle speed acceleration compensation/ delay and throttle rate compensation delay is illustrated in FIG. 6 in a format representing locations in electronic memory accessible on the basis of the corresponding upshifts and downshifts.

New control variables, vehicle speed compensation control variable Vv(t) and throttle rate compensation delay Ta(t), are determined from the following relationships:

$$Vv(t) = Vv + T(n)*a;$$

$$Ta(t) = Ta + T(n)*b$$

wherein T(n) is the delay or time compensation value, those values of FIG. 6 corresponding to the appropriate gearshift that is to be commanded; a is the time rate of change of vehicle speed; and b is the time rate of change of throttle position.

Using the compensated values of Vv(t) and Ta(t) in place of vehicle speed Vv and throttle position Ta, respectively, the appropriate gear ratio is determined from the shift schedule of FIG. 4.

An inquiry is made at statement 20 to determine, on the basis of the gear ratio established at statement 18 and the current gear ratio established at statement 10, whether an upshift or a downshift is to be commanded. If an upshift is commanded, at statement 22 an inquiry is made to determine whether second gear is the gearshift to which the upshift is made. If second gear is the appropriate gear, statement 24 is executed and the central processing unit produces signals output to the output driver circuits of the microprocessor, which energize and deenergize the three shift solenoids in accordance with the schedule of FIG. 3. If statement 22 is false, an inquiry is made at statement 26 to determine whether an upshift to third gear is to occur. If so, the state of the three shift solenoids is changed in accordance with the schedule of FIG. 3 to produce third gear ratio. If statement 26 is false, the state of the three shift solenoid is changed in accordance with the schedule of FIG. 3 to produce fourth gear ratio.

However, if, after the appropriate gear ratio is determined, a downshift is to result, control passes then to statement 28 where signals issue from the CPU to the driver circuits changing the state of the three shift solenoids to produce third gear ratio. If statement 32 is false, a test is made at statement 34 to determine whether a downshift to second gear is to occur. If so, the CPU issues signals to the output driver circuits changing the state of the three shift solenoids to produce second gear. If statement 34 is false, then the state of the three shift solenoids is changed in accordance with the schedule of FIG. 3 to produce first gear ratio.

To provide delay compensation according to the present invention, it is only necessary to use the two new control variables in place of vehicle speed and throttle position in reading the predetermined shift schedule of FIG. 4. Ideally, the value of T(n) is set equal to the transmission delay time that is to be compensated. This may not always be possible depending on the noise of the signals and the magnitude of the delay. Certain situations may only permit partial delay compensation. The values of T(n) are functions of the specific gearshift involved and they also vary with other operating conditions such as vehicle speed and engine torque. The shift mapping process described here may be modified to provide information also for setting required values of T(n) in accordance with other appropriate parameters than the appropriate gearshift.

Having described a preferred embodiment of my invention, what I claim and desire to secure by U.S. Letters Patent is:

1. A system for controlling gearshifts in an automatic multiple gear ratio transmission for an automotive vehicle having an engine controlled by a variable position throttle, comprising:

multiple ratio gearing and pressure-operated friction elements selectively engaged and released to produce multiple gear ratios through said gearing;

a hydraulic circuit having multiple shift control valves for selectively engaging and releasing said friction elements;

means for determining current vehicle speed and current vehicle longitudinal acceleration;

means for determining the currently engaged gear;

means for retaining a predetermined gearshift schedule relating current throttle position and current vehicle speed, the schedule defining, for each current gear, a range of operating conditions established by paired values of current throttle position and current vehicle speed, each range extending between an upshift boundary at which an upshift is permitted from each current gear and a downshift boundary at which an downshift is permitted from each current gear;

means for retaining a predetermined delay variable associated with upshifts and downshifts from a current gear;

means for determining an adjusted vehicle speed from current vehicle speed, vehicle acceleration and a delay variable for said change of gear;

means for commanding a change of gear from the current gear if a boundary of the gearshift schedule for the current gear is crossed due to a change of operating condition defined by paired values of adjusted vehicle speed and current throttle position; and means for producing a gearshift by selectively engaging and releasing the friction elements in response to the gearshift command.

2. The system of claim 1 further comprising:
means for determining current position of the engine throttle and current throttle velocity;

means for determining an adjusted throttle position from current throttle position, throttle speed and a delay variable for said change of gear; and means for commanding a change of gear from the current gear if a boundary of the gearshift schedule for the current gear is crossed due to a change of operating condition defined by paired values of adjusted vehicle speed and adjusted throttle position.

3. The method of claim 2 wherein:

the means for determining an adjusted vehicle speed includes means for calculating adjusted vehicle speed by changing current vehicle speed by a factor equal to the product of current vehicle acceleration and a delay variable associated with said change of gear; and the means for determining an adjusted throttle position includes means for calculating adjusted throttle position by changing current throttle position by a factor equal to the product of current throttle speed and a delay variable associated with said change of gear.

4. The system of claim 1 wherein the means for determining an adjusted vehicle speed includes means for calculating adjusted vehicle speed by changing current vehicle speed by a factor equal to the product of current vehicle acceleration and a delay variable associated with said change of gear.

5. A system for controlling gearshifts in an automatic multiple gear ratio transmission for an automotive vehicle having an engine controlled by a variable position throttle, comprising:

multiple ratio gearing and pressure-operated friction elements selectively engaged and released to produce multiple gear ratios through said gearing;

a hydraulic circuit having multiple solenoid-operated shift control valves for selectively engaging and releasing said friction elements;

means for determining current vehicle speed and vehicle acceleration;

means for determining the currently engaged gear;

electronic memory means for retaining a predetermined gearshift schedule relating current throttle position and current vehicle speed, the schedule defining, for each current gear, a range of operating conditions established by paired values of current throttle position and current vehicle speed, each range extending between an upshift boundary at which an upshift is permitted from each current gear and a downshift boundary at which a downshift is permitted from each current gear, and for retaining a predetermined delay variables, each delay variable being associated with a change of gear from a current gear;

electronic processor means for determining an adjusted vehicle speed from current vehicle speed, vehicle acceleration and said delay variable, and for producing a gearshift command changing the state of the solenoids that operate the shift valves from states corresponding to the current gear to states corresponding to another gear if a boundary of the gearshift schedule is crossed due to a change of operating condition defined by paired values of adjusted vehicle speed and current throttle position; and means for producing a gearshift by selectively engaging and releasing the friction elements in response to the new state of the solenoids.

6. The system of claim 5 further comprising means for generating a signal representing current position of the engine throttle and current throttle velocity, and wherein the processor means further includes means for determining an adjusted throttle position from current throttle position, throttle speed and said delay factor, and means for commanding a gearshift from the current gear if a boundary of the gearshift schedule is crossed due to a change of operating condition defined by paired values of adjusted vehicle speed and adjusted throttle position.

7. The system of claim 6 wherein:

the processor means further includes:

means for calculating adjusted vehicle speed by changing current vehicle speed by a factor equal to the product of current vehicle acceleration and a delay variable associated with said change of gear; and means for calculating adjusted throttle position by changing current throttle position by a factor equal to the product of current throttle speed and a delay variable associated with said change of gear.

8. The system of claim 5 wherein the processor means further includes:

means for calculating adjusted vehicle speed by chancing current vehicle speed by a factor equal to the product of current vehicle acceleration and a delay variable associated with said change of gear.

means for calculating adjusted throttle position by changing current throttle position by a factor equal to the product of current throttle speed and a delay vairable associated with said change of gear.

9. The method for controlling gearshifts in an automatic transmission having multiple ratio gearing and pressure-operated friction elements selectively engaged and released to produce multiple gear ratios through said gearing and a hydraulic circuit having multiple shift control valves for selectively engaging and releasing said friction elements, the transmission adapted for connection to an engine controlled by a variable position throttle, comprising the steps of:

determining current vehicle speed and current vehicle acceleration;

determining the currently engaged gear;

defining a predetermined gearshift schedule relating current throttle position and current vehicle speed, the schedule defining, for each current gear, a range of operating conditions established by paired values of current throttle position and current vehicle speed, each range extending between an upshift boundary at which an upshift is permitted from each current gear and a downshift boundary at which an downshift is permitted from each current gear;

defining a predetermined delay variable associated with upshifts and downshifts from a current gear;

determining an adjusted vehicle speed from current vehicle speed, vehicle acceleration and a delay variable for said change of gear;

commanding a change of gear from the current gear if a boundary of the gearshift schedule for the current gear is crossed due to a change of operating condition defined by paired values of adjusted vehicle speed and current throttle position; and producing a gearshift by selectively engaging and releasing the friction elements in response to the gearshift command.

10. The method of claim 9 further comprising:

determining current position of the engine throttle and current throttle velocity;

determining an adjusted throttle position from current throttle position, throttle speed and a delay variable for said change of gear;

commanding a change of gear from the current gear if a boundary of the gearshift schedule for the current gear is crossed due to a change of operating condition defined by paired values of adjusted vehicle speed and adjusted throttle position; and producing a gearshift by selectively engaging and releasing the friction elements in response to the gearshift command.

11. The method of claim 10 further comprising:
calculating adjusted vehicle speed by changing current vehicle speed by a factor equal to the product of current vehicle acceleration and a delay variable associated with said change of gear; and means for calculating adjusted throttle position by changing current throttle position by a factor equal to the product of current throttle speed and a delay variable associated with said change of gear.

12. The method of claim 9 further comprising:
calculating adjusted vehicle speed by changing current vehicle speed by a factor equal to the product of current vehicle acceleration and a delay variable associated with said change of gear.

* * * * *